(12) United States Patent  (10) Patent No.: US 7,089,727 B2
Schütz                     (45) Date of Patent:    Aug. 15, 2006

(54) GAS TURBINE PLANT WITH AN EXHAUST GAS CHIMNEY

(75) Inventor: Herbert Schütz, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/614,002

(22) Filed: Jul. 8, 2003

(65) Prior Publication Data

US 2004/0088994 A1    May 13, 2004

(51) Int. Cl.
*F02C 7/08* (2006.01)
*F02G 1/00* (2006.01)
*F02G 3/00* (2006.01)

(52) U.S. Cl. .................... 60/39.5; 60/772; 60/39.511; 60/39.181

(58) Field of Classification Search ................ 60/772, 60/39.182, 39.15, 39.181, 39.183, 39.5, 39.511
See application file for complete search history.

(56) References Cited

U.S. PATENT DOCUMENTS

| | | | | |
|---|---|---|---|---|
| 4,106,286 A | * | 8/1978 | Sakai et al. | 60/39.182 |
| 4,466,241 A | * | 8/1984 | Inui et al. | 60/39.182 |
| 4,821,771 A | | 4/1989 | Maxwell | |
| 5,267,434 A | * | 12/1993 | Termuehlen et al. | 60/39.182 |
| 5,282,355 A | * | 2/1994 | Yamaguchi | 60/39.5 |
| 5,493,854 A | * | 2/1996 | Nielsen | 60/783 |
| 5,715,672 A | * | 2/1998 | Schockemoehl et al. | 60/39.5 |
| 6,050,084 A | * | 4/2000 | Schutz et al. | 60/39.5 |
| 6,055,803 A | * | 5/2000 | Mastronarde | 60/783 |
| 6,125,623 A | | 10/2000 | Cloyd et al. | |
| 6,141,950 A | * | 11/2000 | Smith et al. | 60/783 |
| 6,477,842 B1 | * | 11/2002 | Nagata et al. | 60/772 |
| 6,539,702 B1 | * | 4/2003 | Nishimura et al. | 60/39.5 |
| 6,820,409 B1 | * | 11/2004 | Braun | 60/39.5 |
| 6,851,514 B1 | * | 2/2005 | Han et al. | 181/224 |
| 6,966,172 B1 | * | 11/2005 | Nishimura et al. | 60/39.182 |
| 2001/0029732 A1 | * | 10/2001 | Bachmann | 60/39.02 |
| 2002/0011065 A1 | | 1/2002 | Nishimura et al. | |
| 2004/0200225 A1 | * | 10/2004 | Mittricker | 60/783 |

FOREIGN PATENT DOCUMENTS

| | | |
|---|---|---|
| DE | 4040703 A1 | 6/1992 |
| DE | 4312072 A1 | 10/1993 |
| DE | 19636107 A1 | 1/1998 |
| DE | 19737507 A1 | 3/1999 |
| EP | 0 677 646 A1 | 10/1995 |

\* cited by examiner

*Primary Examiner*—William H. Rodriguez
(74) *Attorney, Agent, or Firm*—Harness, Dickey & Pierce, P.L.C.

(57) ABSTRACT

A gas turbine installation includes at least one gas turbine. A transition piece may receive an exhaust gas from the gas turbine. The transition piece is an exhaust gas inlet part of a steam recovery part for a steam generator. The transition piece includes a chimney orifice for discharging the exhaust gas of the gas turbine.

16 Claims, 1 Drawing Sheet

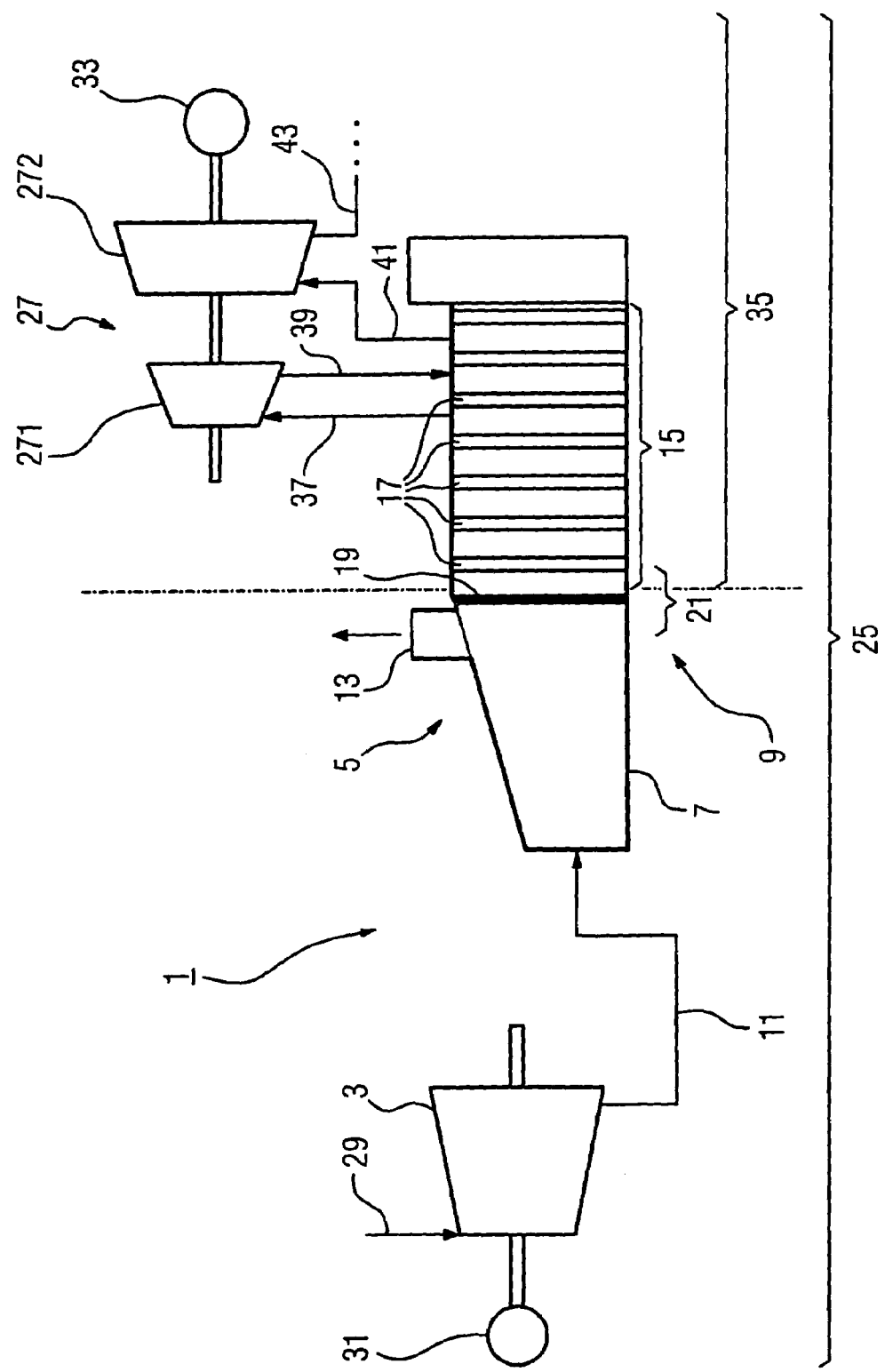

GAS TURBINE PLANT WITH AN EXHAUST GAS CHIMNEY

The present application claims priority under 35 U.S.C. §119 on European patent application number EP 02015201.3 filed Jul. 8, 2002, the entire contents of which are incorporated herein by reference.

FIELD OF THE INVENTION

The invention generally relates to a gas turbine installation.

BACKGROUND OF THE INVENTION

In a gas turbine installation, while it is in operation, exhaust gas has to be extracted from the gas turbine and discharged. It is necessary, as a rule, to erect a special chimney for this purpose.

A chimney of this kind is also necessary, and has to be erected separately, when the gas turbine installation is extended by way of a steam generator to form a gas and steam turbine installation (combined-cycle installation). Here, the exhaust gas from the gas turbine is utilized for the generation of steam to be used by the steam turbine. A chimney is also necessary when gas turbine operation is desired, even before the completion of the entire combined-cycle installation ("preferential gas turbine operation").

A bypass chimney, as it is known, is erected and used for the discharge of the exhaust gas from the gas turbine, at least until the components relating to the steam turbine are installed and ready for operation. Once the combined-cycle installation is completed, the exhaust gas from the gas turbine can be introduced into a waste-heat steam generator, thereby obviating the need for the bypass chimney. The erection of a bypass chimney of this kind and its possible dismantling after the completion of the combined-cycle installation are complicated.

SUMMARY OF THE INVENTION

An object of an embodiment of the invention is to specify an improved gas turbine installation with an exhaust gas chimney. The exhaust gas chimney may be implemented simply and cost-effectively.

An object may be achieved, according to an embodiment of the invention, by way of a gas turbine installation with at least one gas turbine and a transition piece, which is an exhaust gas inlet part of a heat recovery structure for a steam generator. Exhaust gas from the gas turbine can be introduced into the transition piece and can be discharged from the transition piece through a chimney orifice.

An embodiment of the invention proceeds, in this context, from the notion that, particularly in instances where the erection of a combined-cycle installation with preferential gas turbine operation is to take place, the erection of a bypass chimney for discharging the exhaust gas from the gas turbine may be dispensed with.

In connection with an embodiment of the invention, the function of the bypass chimney is assumed by the transition piece of a steam generator, in particular of the steam generator which is provided for a steam turbine at a later stage of the extension of the installation for steam generation and which is to be completely installed. The transition piece is, in particular, the inlet duct of a heat recovery structure for a steam generator, said inlet duct being arranged in the direction of flow of the exhaust gas and exhaust gas being capable of being supplied to the boiler region (i.e., the heat recovery structure) of the steam generator by way of the inlet duct.

As a result, an additional chimney does not have to be installed and an extension of a gas turbine installation according to an embodiment of the invention to form a combined-cycle installation can be carried out simply and cost-effectively. In this case, the gas turbine installation can continue to be operated, and, in the course of the extension measure, the transition piece of a steam generator, the transition piece serving as an exhaust gas chimney, becomes, when supplemented by the boiler region, the steam generator which is still to be connected to a steam turbine.

Furthermore, an embodiment of the invention affords the advantage that, in comparison with solutions from the prior art, in which a separate bypass chimney is erected for the preferential gas turbine operation, the necessary pipeline connections to the steam turbine are shortened. This is because the design of a combined-cycle installation is not influenced by a separate bypass chimney and the pipelines can therefore be kept as short as possible.

Advantageously, the transition piece has a sealing wall, by which the emergence of exhaust gas from the transition piece, except for the chimney orifice, is prevented. The sealing wall in this case advantageously closes a transitional region of the transition piece, said transitional region issuing into the boiler region in the direction of flow of the exhaust gas.

In the case of a steam generator, the transitional region from the transition piece into the boiler region, where the heating surfaces for steam generation are arranged, is not separated from the boiler region. This is a consequence of construction, since it is precisely the introduction of the exhaust gas into the boiler region which is desired.

In this embodiment, a closing of the transitional region relative to the boiler region by way of the sealing wall is provided. Thus, on the one hand, the exhaust gas can emerge only through the chimney orifice of the transition piece. Further, on the other hand, the extension of the steam generator can proceed by way of the erection of the boiler region, without the gas turbine operation having to be interrupted. The sealing wall may in this case, in particular, also be provided with a thermally insulating layer for the protection of the assembly personnel.

In an advantageous embodiment of the invention, the chimney orifice is designed as a flow duct which is short, as compared with the vertical extent of the transition piece, and which preferably has a rectangular cross section. In this embodiment, a "duct stub", serving as an outlet orifice for the exhaust gas, is arranged at a suitable point of the transition piece. A short flow duct of this kind can easily be produced and can easily be integrated as a chimney orifice into the transition piece or be mounted on the latter.

Since the transition piece of known steam generators is often of essentially box-shaped design, a short flow duct with a rectangular cross section can be implemented in a particularly simple way in connection with an embodiment of the invention.

In a gas turbine installation according to an embodiment of the invention, the chimney orifice is preferably arranged in a head region of the transition piece. The head region of the transition piece in this case includes, in particular, an upper boundary surface of the transition piece.

In a particularly preferred embodiment of the invention, the gas turbine installation can be extended to form a combined-cycle installation. The transition piece is capable of being extended by way of the boiler region to form an operational steam generator. A steam turbine is capable of being connected to the steam generator.

In this embodiment, it is possible, starting from a gas turbine installation according to an embodiment of the invention, to arrive at a combined-cycle installation. This is because there is no need for major structural and/or design-related changes and/or for setting up auxiliary components of the gas turbine installation.

The boiler region of the steam generator is added to the gas turbine installation according to an embodiment of the invention. A result is that the steam generator is completed. Furthermore, the steam generator is connected to the steam turbine.

After the removal of a sealing wall which is present, if appropriate, and which closes a transitional region of the transition piece in relation to the boiler region, and also after the closing of the chimney orifice of the transition piece, the combined-cycle installation which is thus obtained is immediately ready for use. It is ready without the auxiliary components, for example a bypass chimney, constructed provisionally if appropriate, having to be removed and without components designed with regard to the gas turbine installation having to be dimensioned differently for the changeover to a combined-cycle operation.

An embodiment of the invention leads, furthermore, to a method of operating a gas turbine installation. An exhaust gas from the gas turbine can be fed into a transition piece. The exhaust gas can be discharged from the transition piece through a chimney orifice of the transition piece. The transition piece is an exhaust gas inlet part of a heat recovery structure for a steam generator.

Further advantageous refinements exist in the use according to embodiments of the invention.

BRIEF DESCRIPTION OF THE DRAWINGS

An exemplary embodiment of the invention is illustrated in more detail below, wherein, in the drawing:

The FIGURE shows a gas turbine installation according to an embodiment of the invention.

DETAILED DESCRIPTION OF THE PREFERRED EMBODIMENTS

The FIGURE illustrates a gas turbine installation 1 according to an embodiment of the invention. Flue gas 29 is fed into a gas turbine 3 for the operation of the latter and is converted into rotational energy by means of the gas turbine 3 and transformed into electrical energy by means of a generator 31 connected to the gas turbine 3. Exhaust gas 11 from the gas turbine 3 is introduced into the transition piece 7 of a known steam generator 9.

The transition piece 7 of known steam generators 9 includes, in this case, that component of known steam generators by way of which the exhaust gas 11 can be supplied to a boiler region 15 of the steam generator 9. The boiler region follows the transition piece 7 in the direction of flow of the exhaust gas 11. In known steam generator 9, at least one heating surface 17 for the generation of steam, for example for a steam turbine 27, is arranged in the boiler region 15. The heating surfaces 17 may in this case be formed, for example, by steam generator tubes. In this way, the boiler region 15 (serving as a heat recovery structure) may utilize the gas exhaust energy to generate steam.

According to an embodiment of the invention, the transition piece 7 has a chimney orifice 13 which is formed, for example, by a flow duct which is short in comparison with the vertical extent of the transition piece 7. This short flow duct preferably has a rectangular cross section. The exhaust gas 11 introduced from the gas turbine 3 into the transition piece 7 is discharged through the chimney orifice 13, so that an exhaust gas chimney 5 according to an embodiment of the invention is formed by the transition piece 7 of a known steam generator 9.

In a gas turbine installation 1 according to an embodiment of the invention, it is therefore unnecessary to erect a bypass chimney in order to discharge the exhaust gas 11 from the gas turbine 3. This is particularly true when, in a later extension step of the gas turbine installation 1, extension components 35, which include a boiler region 15 of the steam generator 9 and the steam turbine 27, are provided in order to extend the gas turbine installation 1 so as to form a combined-cycle installation 25.

Since, in such a situation, the erection of the steam generator 9 is necessary in any case, according to an embodiment of the invention the transition piece 7 of the steam generator 9 is installed and is used as an exhaust gas chimney 5 according to an embodiment of the invention for the exhaust gas 11 from the gas turbine 3. In the event of a later extension of the gas turbine installation 1, the transition piece 7 can then be retained and be supplemented to form an operational steam generator 9 by the addition of the boiler region 15 (or heat recovery structure).

So that the exhaust gas 11 is discharged only via the intended chimney orifice 13 when the gas turbine installation 1 is in operation, a sealing wall 19 is provided in a transitional region 21 of the transition piece 7. The transitional region issues into the boiler region 15 in the direction of flow of the exhaust gas 11. The sealing wall closes the transitional region 21, so that the exhaust gas 11 is discharged only via the chimney orifice 13.

If the FIGURE is interpreted as an illustration in longitudinal section, the sealing wall 19 extends transversely to the direction of flow of the exhaust gas 11.

When the gas turbine installation 1 is to be extended into a combined-cycle installation by the addition of the extension components 35 and is to be put into operation, then only the sealing wall 19 has to be removed and the chimney orifice 13 closed, for example welded. Thus, the exhaust gas 11 from the gas turbine 3 can be introduced into the boiler region 15 of the steam generator 9, in order to generate steam there for the steam turbine 27 in heat exchange with the heating surfaces 17.

In the present exemplary embodiment, the steam turbine 27 includes a first turbine stage 271, for example high-pressure stage, and a second steam turbine stage 272, for example a low-pressure stage. The first steam turbine stage 271 is supplied, in a way not illustrated in any more detail, by the steam generator 9 with operating steam 37 which converts at least part of its energy into the rotational energy in the first steam turbine stage 271 and is supplied as partially expanded steam 39 to the steam generator 9 for intermediate superheating. The steam 41 thus intermediately superheated is supplied to the second steam turbine stage 272, where energy conversion into rotational energy takes place again. The rotational energy generated by means of the steam turbine 27 is converted into electrical energy by means of a generator 33.

The residual steam 43 leaving the second steam turbine stage 272 may be supplied, for example, to a condenser.

In summary, an essential advantage of a gas turbine installation 1 according to an embodiment of the invention is that the exhaust gas 11 from the gas turbine 3 is discharged by way of a component which is required in any case during a later extension stage of the installation. It therefore, on the one hand, assumes the function of the exhaust gas chimney 5 during the operation of the gas turbine installation 1, so that the erection of a separate bypass chimney is dispensed with. Further, on the other hand, it can be left as it is when the gas turbine installation is extended to form a combined-cycle installation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas turbine installation, comprising:
   at least one gas turbine; and
   a transition piece for receiving an exhaust gas from the gas turbine,
   wherein the transition piece is an exhaust gas inlet part of a heat recovery structure for a steam generator,
   wherein the transition piece includes a chimney orifice for discharging the exhaust gas of the gas turbine, and
   wherein the chimney orifice is a flow duct that is shorter than a maximum vertical height of the transition piece.

2. The gas turbine installation as claimed in claim 1, wherein the transition piece includes a sealing wall, by which the emergence of exhaust gas from the transition piece, except for the chimney orifice, is prevented.

3. The gas turbine installation as claimed in claim 2, wherein the sealing wall closes a transitional region of the transition piece.

4. The gas turbine installation as claimed in claim 1, wherein the chimney orifice is arranged in a head region of the transition piece.

5. The gas turbine installation as claimed in claim 1, wherein the heat recovery structure is a boiler region of a steam turbine.

6. The gas turbine installation as claimed in claim 1, wherein the chimney orifice has a rectangular cross section.

7. A method of operating a gas turbine installation, comprising:
   feeding an exhaust gas of a gas turbine into a transition piece; and
   discharging the exhaust gas via a chimney orifice of the transition piece,
   wherein the transition piece is an exhaust gas inlet part of a heat recovery structure for a steam generator, and
   wherein the chimney orifice is a flow duct that is shorter than a maximum vertical height of the transition piece.

8. The method as claimed in claim 7, wherein the transition piece includes a sealing wall, by which emergence of exhaust gas from the transition piece, except through the chimney orifice, is prevented.

9. The method as claimed in claim 8, wherein the sealing wall closes a transitional region of the transition piece.

10. The method as claimed in claim 7, wherein the chimney orifice is arranged in a head region of the transition piece.

11. The method as claimed in claim 7, wherein the chimney orifice has a rectangular cross section.

12. A gas turbine installation, comprising:
    at least one gas turbine; and
    a transition piece for receiving an exhaust gas from the gas turbine,
    wherein the transition piece is an exhaust gas inlet part of a boiler region of a steam generator,
    wherein the transition piece includes a chimney, and
    wherein the chimney orifice is a flow duct that is shorter than a maximum vertical height of the transition piece.

13. The gas turbine installation as claimed in claim 12, wherein the transition piece includes a sealing wall, by which the emergence of exhaust gas from the transition piece, except for a chimney orifice, is prevented.

14. The gas turbine installation as claimed in claim 13, wherein the sealing wall closes a transitional region of the transition piece.

15. The gas turbine installation as claimed in claim 12, wherein the chimney is arranged in a head region of the transition piece.

16. The gas turbine installation as claimed in claim 12, wherein the gas turbine installation is extendable to form a combined-cycle turbine installation, the transition piece being extendable to form an operational steam generator via the boiler region, and a steam turbine being connectable to the steam generator.

* * * * *